(12) United States Patent
Stone

(10) Patent No.: US 8,113,842 B2
(45) Date of Patent: Feb. 14, 2012

(54) SYSTEMS AND METHODS FOR PROVIDING EDUCATIONAL STRUCTURES AND TOOLS

(76) Inventor: Joyce S. Stone, Provo, UT (US)

( * ) Notice: Subject to any disclaimer, the term of this patent is extended or adjusted under 35 U.S.C. 154(b) by 974 days.

(21) Appl. No.: 11/938,686

(22) Filed: Nov. 12, 2007

(65) Prior Publication Data

US 2008/0182230 A1     Jul. 31, 2008

Related U.S. Application Data

(60) Provisional application No. 60/858,614, filed on Nov. 13, 2006.

(51) Int. Cl.
*G09B 17/00* (2006.01)

(52) U.S. Cl. .................... 434/178; 434/156; 434/167

(58) Field of Classification Search .......... 434/156–157, 434/171–173, 178; 273/153 S
See application file for complete search history.

(56) References Cited

U.S. PATENT DOCUMENTS

| | | | | |
|---|---|---|---|---|
| 1,412,204 A | * | 4/1922 | Derby | 434/172 |
| 3,670,427 A | * | 6/1972 | Stolpen | 434/157 |
| 3,674,264 A | * | 7/1972 | Boercker | 273/445 |
| 3,683,516 A | * | 8/1972 | Fass | 434/164 |
| 3,750,307 A | * | 8/1973 | Phillips et al. | 434/174 |
| 3,872,975 A | * | 3/1975 | Silver | 211/195 |
| 4,158,921 A | * | 6/1979 | Stolpen | 434/403 |
| 4,219,197 A | * | 8/1980 | Acuff | 273/299 |
| 4,437,667 A | * | 3/1984 | Miller | 273/153 S |
| 4,519,606 A | * | 5/1985 | Lussiez | 273/429 |
| 5,239,665 A | | 8/1993 | Tsuchiya | |
| 5,463,725 A | | 10/1995 | Henckel et al. | |
| 5,523,775 A | | 6/1996 | Capps | |
| 5,661,635 A | | 8/1997 | Huffman et al. | |
| 5,702,105 A | * | 12/1997 | Glikmann | 273/272 |
| 5,761,485 A | | 6/1998 | Munyan | |
| 5,774,109 A | | 6/1998 | Winksy et al. | |
| 5,799,267 A | * | 8/1998 | Siegel | 704/1 |
| 5,802,516 A | | 9/1998 | Shwarts et al. | |
| 5,803,743 A | * | 9/1998 | Kaufman | 434/159 |
| 5,947,741 A | * | 9/1999 | Villarreal | 434/171 |
| 5,991,594 A | | 11/1999 | Froeber et al. | |
| 6,229,502 B1 | | 5/2001 | Schwab | |
| 6,358,059 B1 | * | 3/2002 | Li | 434/402 |
| 6,435,504 B1 | * | 8/2002 | Nightingale | 273/272 |
| 6,435,877 B2 | * | 8/2002 | Wasowicz | 434/167 |

(Continued)

OTHER PUBLICATIONS

Franseth et al., "Survey of Research on Grouping as Related to Puple Learning", Educational Resources Information Center, 1966, (ED013697).

*Primary Examiner* — Xuan Thai
*Assistant Examiner* — Robert J Utama
(74) *Attorney, Agent, or Firm* — David B. Tingey; Kirton & McConkie

(57) ABSTRACT

Systems and methods are disclosed for providing educational structures and tools to enhance the effectiveness of teaching multiple academic disciplines. Both age-level and subject-focused instructors may be provided; technical tools facilitate student-focused, individualized learning experiences wherein integrated electronic records are maintained to track student progress and guide future efforts. A spiral curriculum provides flexibility to instructors and students. Read-aloud e-books may be provided that permit a student to control the rate of reading and identify areas where increased understanding is needed. Reading progress may be enhanced by use of an electronically implemented autophonics structure to identify areas of weak understanding. Many other technical tools may also be provided.

17 Claims, 4 Drawing Sheets

U.S. PATENT DOCUMENTS

| | | |
|---|---|---|
| 6,519,571 B1 | 2/2003 | Guheen et al. |
| 6,685,477 B1 * | 2/2004 | Goldman et al. ............. 434/172 |
| 6,985,135 B2 | 1/2006 | Sugimoto |
| 7,011,525 B2 * | 3/2006 | Mejia ............................ 434/167 |
| 7,020,663 B2 | 3/2006 | Hay et al. |
| 7,185,274 B1 | 2/2007 | Rubin et al. |
| 7,748,634 B1 | 7/2010 | Zehr et al. |
| 2001/0051329 A1 | 12/2001 | Lynch et al. |
| 2002/0054073 A1 | 5/2002 | Yuen |
| 2002/0076677 A1 * | 6/2002 | Wasowicz et al. ............ 434/178 |
| 2002/0180767 A1 | 12/2002 | Northway et al. |
| 2003/0014674 A1 | 1/2003 | Huffman et al. |
| 2003/0031987 A1 * | 2/2003 | Gore et al. .................... 434/156 |
| 2006/0026536 A1 | 2/2006 | Hotelling et al. |
| 2006/0066510 A1 | 3/2006 | Takahashi |
| 2006/0133664 A1 | 6/2006 | Hong et al. |
| 2006/0194181 A1 | 8/2006 | Rosenberg |
| 2006/0256083 A1 | 11/2006 | Rosenberg |
| 2007/0005616 A1 | 1/2007 | Hay et al. |
| 2008/0204426 A1 | 8/2008 | Hotelling et al. |
| 2009/0253106 A1 * | 10/2009 | Gore et al. .................... 434/156 |

* cited by examiner

SYSTEMS AND METHODS FOR PROVIDING EDUCATIONAL STRUCTURES AND TOOLS

RELATED APPLICATIONS

This application claims priority to U.S. Provisional Patent Application Ser. No. 60/858,614 filed Nov. 13, 2006, entitled SYSTEMS AND METHODS FOR PROVIDING EDUCATIONAL STRUCTURES AND TOOLS.

BACKGROUND OF THE INVENTION

1. Field of the Invention

The present invention relates to systems and methods for providing educational structures and tools. In particular, the present invention relates to systems and methods for providing non-linear educational structures and tools that may be directed at least in part by either instructors or by learners, and certain technology based tools to facilitate those educational structures and tools.

2. Background and Related Art

The traditional structure of educational institutions is not suited to self-directed, technology assisted learning. The use of rigid and standardized age-based grade levels can detract from the flexibility needed to meet the needs of many students. One example of the detrimental effects of such rigidity occurs when a student refuses to read a book that is classified at a grade or reading level below the level corresponding to the student's age, assuming the book is only for "little kids" when in fact the book may have much yet to teach students at grade or reading levels beyond its rigid classification.

A second example occurs when those instructors having the least experience are placed directly in a classroom where they have the most profound influence on students. Whereas those instructors who have additional experience and education are encouraged by the structure of prior art systems and institutions to move from the classroom to school administration, school district administration, or to government-related educational position (such as county education board or state board of education), all of which have only an indirect and thus a less profound effect and influence on the lives and education of individual students.

Currently available educational institutions and structures simulate a factory environment, in which students can be moved from grade to grade and subject to subject as if fungible items, without regard for individual needs, preferences, or challenges. Such institutions are teacher-focused rather than student-focused, without flexibility in meeting the needs of individuals except by advancing or restraining students by a full grade level. Such institutions are further focused on administrative efficiency as defined in a non-information age world, in that curriculum development, ordering of curriculum supplies, including textbooks, the administration and grading of examinations, and many similar activities, are designed around administrative efficiency rather than educational effectiveness.

Thus, while techniques currently exist that are used to teach subjects such as reading or language arts, as well as others, within an educational institution, challenges still exist, including the lack of structural support for technological tools, the lack of efficiency in tracking the learning progress of individual students, the nature of institutional incentives provided to instructors, and otherwise. Accordingly, it would be an improvement in the art to augment or even replace current techniques with other techniques.

SUMMARY OF THE INVENTION

The present invention relates to systems and methods for providing educational structures and tools. In particular, the present invention relates to systems and methods for providing non-linear educational structures and tools that may be directed at least in part by either instructors or by learners, and certain technology based tools to facilitate those educational structures and tools. Structures are included to facilitate educational progress and tools to support such progress within such structures.

Implementation of the present invention takes place in association with classroom organizational structures and with certain technical tools as described herein. Such structures and tools are intended to provide each student with an environment and support sufficient to reach his or her unique potential, physically, emotionally, socially and spiritually.

Implementations of the present invention comprises, without limitation, a system of educational instruction using a novel structure that is less rigid than prior art systems and that presents behavioral incentives coordinated to provide greater benefit to students than prior art systems and methods.

Implementations of the present invention further comprises, without limitation, technical tools by which the systems and methods disclosed may be implemented, such as electronic means for teaching reading and related language arts skills in a self-directed manner, wherein a record of student activity is maintained for review by instructors and wherein students may progress using electronic tools according to individual needs rather than in lock-step with a larger group of students or a pre-defined curriculum.

Additional technical tools disclosed include electronic means of discovering and assisting with specific areas of focus in teaching phonics to beginning readers and electronic means to integrate records of student activities across multiple subjects with the activities of instructors across multiple students and subjects in order to facilitate highly individualized instruction.

While the methods and processes of the present invention have proven to be particularly useful in the area of education, those skilled in the art can appreciate that the methods and processes can be used in a variety of different applications and in a variety of different areas of manufacture to yield improved efficiency in learning environments of many types.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

The present invention relates to systems and methods for providing educational structures and tools. In particular, the present invention relates to systems and methods for providing non-linear educational structures and tools that may be directed at least in part by either instructors or by learners, and certain technology based tools to facilitate those educational structures and tools. Structures are included to facilitate educational progress and tools to support such progress within such structures.

The following disclosure of the present invention is grouped into four subheadings, namely "Educational Structures," "Exemplary Operating Environment for Technical Tools," "Exemplary Embodiments of Technical Tools," and "Spiral Curriculum." The utilization of the subheadings is for convenience of the reader only and is not to be construed as limiting in any sense.

Educational Structures

Figure 1:
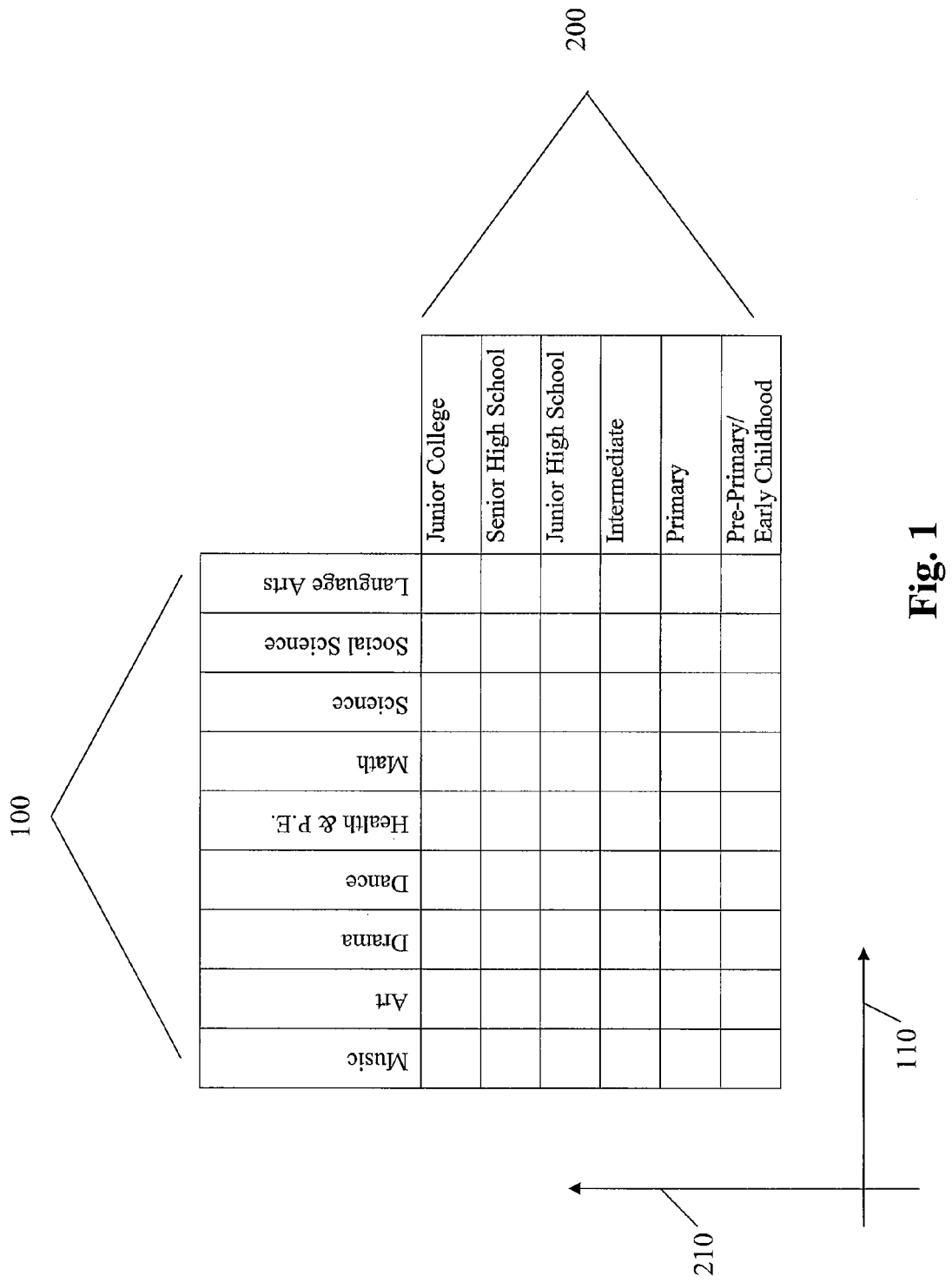
FIG. 1 illustrates levels and disciplines as implemented in one embodiment of the present invention.

According to some aspects, the present invention comprises a system for organizing an educational environment. This educational environment may be implemented in a traditional "brick and mortar" school or via distance learning methods as are known in the art, including via electronic resources such as those disclosed herein and via other networked means including the Internet. The educational environment may comprise an organization that may be represented schematically as shown in FIG. 1, in which multiple academic disciplines 100 are represented along a first axis 110 and levels of sophistication (or simply a level) 200 within each academic discipline 100 are represented along a second axis 210. In some embodiments, five levels of sophistication are provided: pre-primary (also called early childhood), primary, intermediate, junior high school, and senior high school. These levels of sophistication 200 may or may not correspond to the age of participants, as generally this embodiment is not tied to age or grade level as is known in the prior art.

According to some embodiments, a single student may be placed at any or multiple positions within the structure illustrated in FIG. 1. For example, a single student may simultaneously be positioned at the primary level for math instruction, at the pre-primary level for language arts instruction, and at the intermediate level for music instruction, depending on factors such as the student's prior experiences, inherent gifts, and the facilities of the institution in which the educational structure is implemented. The structure disclosed, in connection with the technical tools, examples of which are disclosed herein, permit each student within an educational environment to operate independently of other students and at varying levels in different academic disciplines 100 based on the student's readiness in each such discipline 100.

Notwithstanding the foregoing, it is preferable in some embodiments to keep students, especially younger students, working with children in their own age group, permitting each to progress as far as possible in developing skills within specific academic disciplines while operating within that age group. Thus, a general guideline that may be appropriate in some embodiments corresponds to ages and grade levels of the prior art as follows:

Pre-primary level: pre-school through grades K-1, ages 3 through 5

Primary level: grades 1-2-3-4, ages 6-7-8

Intermediate level: grades 4-5-6-7, ages 9-10-11

Junior high school level: grades 7-8-9-10, ages 12-13-14

Senior high school level: grades 10-11-12 and

Junior college, ages 15-16-17-18

In some embodiments, the educational structure is facilitated by instructors of two varieties working substantially concurrently with each group of student participants. A first variety comprises a level instructor. The level instructor is responsible for the educational progress of all student participants within a level 200 (such as primary or junior high school). The responsibilities of the level instructor can include, as non-limiting examples, tracking the progress of one or more individuals in multiple subject areas, determining their areas of particular academic strength or weakness, suggesting or recommending additional activities or subject areas to supplement their work, or otherwise guiding and directing their educational progress. A level instructor can have in-depth or specialized knowledge or experience with recognizing and understanding the needs and learning processes of a specific level 200, including of a specific age range, and can also have particular skills in relating to students of one or more levels 200 or age range in creative, positive, and inspiring ways. A level instructor can have specific skills in areas such as, without limitation, human relations, developing self worth and positive self-concepts, and teaching function- and topic-independent learning skills. A level instructor can ensure that each student is progressing adequately within multiple academic disciplines, as well as developing socially and emotionally, such as developing skills in cooperation and working in small groups or teams.

A second variety of instructor comprises a subject matter instructor. The subject matter instructor is responsible for the progress of all students across multiple levels 200 (such as pre-primary, primary, and intermediate) within a specific academic discipline 100. By providing multiple subject matter instructors, this embodiment can ensure that every student has access to an excellent instructor in every academic discipline 100. Such a structure encourages those teachers with the greatest capacity and creativity relative to a given academic discipline 100, including the greatest ability to communicate concepts in that academic discipline 100 and to diagnose the needs of individual students, to remain in a classroom, having direct contact with students, rather than leaving the classroom to seek administrative positions that offer greater prestige or pay as in an educational institution as known in the prior art. Thus, in this embodiment, the most highly qualified instructors are positioned so as to have the greatest direct influence on the education of students.

A subject matter instructor can determine the appropriate instructional level for individual students working in the academic discipline 100 that is the focus of that subject matter instructor, including providing advanced instruction, which can be provided without removing the student from the student's age-group setting. Thus, each student is provided with access to multiple instructors having expertise in one or more specific academic disciplines 100, including instructors that can provide adequate and appropriate instruction in areas where a particular student may be gifted or may struggle.

This embodiment also facilitates an environment in which students can assist one another in learning new material because they are generally in age-based groups and are encouraged by instructors and the environment to learn new material at the greatest rate that they are comfortable with. Each student is thus encouraged to be responsible for his or her own education rather than merely being passively "fed" by an authority figure such as a single instructor.

The number of levels 200 and the number of participants for which a single subject matter instructor is responsible can vary according to many factors, including, without limitation, the number of subject matter instructors assigned to a particular institution or educational environment, the number of student participants within a particular institution or educational environment, the number of academic disciplines 100 for which an individual acts as a subject matter instructor, and others.

A subject matter instructor can focus on one or multiple academic disciplines 100 as appropriate to the needs of an educational institution and the student participants in that institution. As non-limiting examples, a subject matter instructor may focus on progress within academic disciplines 100 such as math, language arts, one or more foreign languages, English as a second language, science, social studies, health or physical education, dance, drama, visual arts, and music (see FIG. 1). In a relatively larger educational instruction or one having a relatively larger number of student participants, a subject matter instructor may have responsibility for a relatively narrower field of focus. For example, in an institution for younger children having 200 student participants, one subject matter instructor may focus on science and another subject matter instructor may focus on visual arts, music, and dance. Conversely, in an institution for older children having 800 student participants, one subject matter instructor may focus on biology, another on chemistry, another on physics, another on visual arts, another on vocal music, another on instrumental music, and another on dance. In some environments, it is appropriate for a subject matter instructor to focus on a broader range of material for a group of younger students (for example, music, drama, and art), but a narrower range of material for a group of older students at the same institution (for example, instrumental music), all in accordance with the needs of the institution and the student, and the skills and experience of the instructor.

By combining a level instructor and a subject matter instructor, students benefit by having a true subject matter specialist who may be especially enthusiastic about the topic being taught, as well as a second instructor who has expertise and enthusiasm for teaching and coaching the educational progress of individuals of a certain age group, with a focus on tracking and assisting development of those students in cooperation with the subject-specific teaching available from multiple subject matter instructors.

All instructors in such embodiments cooperate with one another, according to the expertise and experience of each, for the benefit of students. Because multiple instructors can have responsibility for different aspects of one student's educational experience, each instructor learns to respect the skills and experience of other instructors that he or she works with.

The total number of students within a single classroom or level need not be fixed or defined by the above-described embodiments, and can vary according to factors such as the needs of individual students, the physical facilities available, the number of academic disciplines for which each subject matter instructor is responsible, the age range of students within that classroom, and others.

In one embodiment, the time frame in which the educational institution operates comprises an eight-hour day, so that in some aspects all work is completed during the school day, without the need for additional homework. The institution further operates substantially year-round, with extended summer vacations, but with more limited vacation periods generally than are found in the prior art. In one embodiment, a one-month August vacation is provided, along with shorter winter and spring break periods. Numerous minor holidays, breaks for teacher training, and similar interruptions are not necessarily provided during the course of the school year, so that the flow of instruction is not interrupted.

Exemplary Operating Environment for Technical Tools

Figure 2:
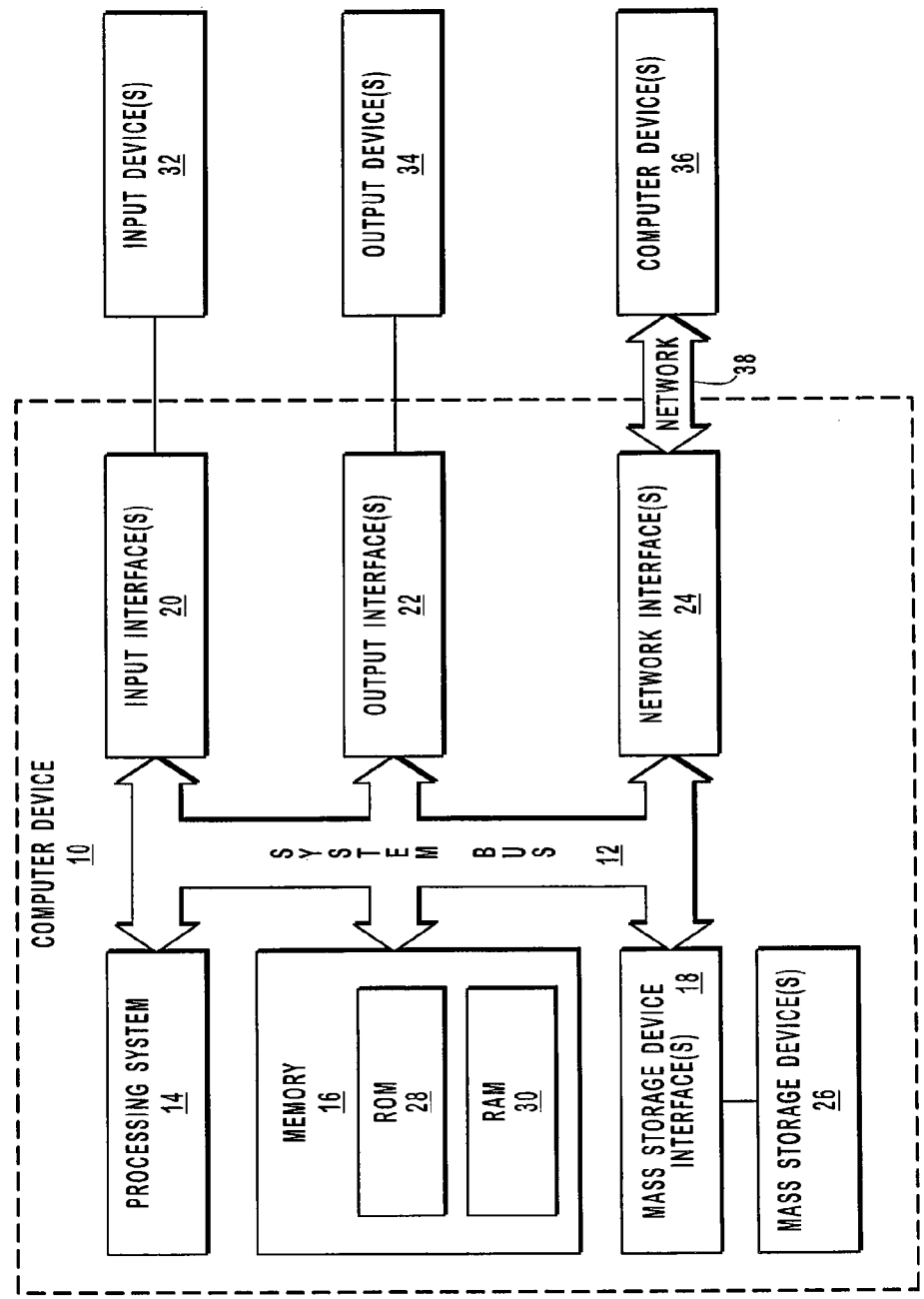
FIG. 2 illustrates a representative system that provides a suitable operating environment for use of the present invention.

A number of technical tools can assist or facilitate the benefits to be derived from structuring an educational institution according to the embodiments described in the previous pages. FIG. 2 and the corresponding discussion below are intended to provide a general description of a suitable operating environment in which technical tools comprised within the invention may be implemented. One skilled in the art will appreciate that these tools may be practiced by one or more computing devices and in a variety of system configurations, including in a networked configuration.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 2, a representative system for implementing the invention includes computer device 10, which may be a general-purpose or special-purpose computer. For example, computer device 10 may be a personal computer, a notebook computer, a personal digital assistant ("PDA") or other hand-held device, a workstation, a minicomputer, a mainframe, a supercomputer, a multi-processor system, a network computer, a processor-based consumer electronic device, or the like.

Computer device 10 includes system bus 12, which may be configured to connect various components thereof and enables data to be exchanged between two or more components. System bus 12 may include one of a variety of bus structures including a memory bus or memory controller, a peripheral bus, or a local bus that uses any of a variety of bus architectures. Typical components connected by system bus 12 include processing system 14 and memory 16. Other components may include one or more mass storage device interfaces 18, input interfaces 20, output interfaces 22, and/or network interfaces 24, each of which will be discussed below.

Processing system 14 includes one or more processors, such as a central processor and optionally one or more other processors designed to perform a particular function or task. It is typically processing system 14 that executes the instructions provided on computer readable media, such as on memory 16, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 14 through system bus 12. Memory 16 may include, for example, ROM 28, used to permanently store information, and/or RAM 30, used to temporarily store information. ROM 28 may include a basic input/output system ("BIOS") having one or more routines that are used to establish communication, such as during start-up of computer device 10. RAM 30 may include one or more program modules, such as one or more operating systems, application programs, and/or program data.

One or more mass storage device interfaces 18 may be used to connect one or more mass storage devices 26 to system bus 12. The mass storage devices 26 may be incorporated into or may be peripheral to computer device 10 and allow computer device 10 to retain large amounts of data. Optionally, one or more of the mass storage devices 26 may be removable from computer device 10. Examples of mass storage devices include hard disk drives, magnetic disk drives, tape drives and optical disk drives. A mass storage device 26 may read from and/or write to a magnetic hard disk, a removable magnetic disk, a magnetic cassette, an optical disk, or another computer readable medium. Mass storage devices 26 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 20 may be employed to enable a user to enter data and/or instructions to computer device 10 through one or more corresponding input devices 32. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 20 that may be used to connect the input devices 32 to the system bus 12 include a serial port, a parallel port, a game port, a universal serial bus ("USB"), a firewire (IEEE 1394), or another interface.

One or more output interfaces 22 may be employed to connect one or more corresponding output devices 34 to system bus 12. Examples of output devices include a monitor or display screen, a speaker, a printer, and the like. A particular output device 34 may be integrated with or peripheral to computer device 10. Examples of output interfaces include a video adapter, an audio adapter, a parallel port, and the like.

One or more network interfaces 24 enable computer device 10 to exchange information with one or more other local or remote computer devices, illustrated as computer devices 36, via a network 38 that may include hardwired and/or wireless links. Examples of network interfaces include a network adapter for connection to a local area network ("LAN") or a modem, wireless link, or other adapter for connection to a wide area network ("WAN"), such as the Internet. The network interface 24 may be incorporated with or peripheral to computer device 10. In a networked system, accessible program modules or portions thereof may be stored in a remote memory storage device. Furthermore, in a networked system computer device 10 may participate in a distributed computing environment, where functions or tasks are performed by a plurality of networked computer devices.

Figure 3:
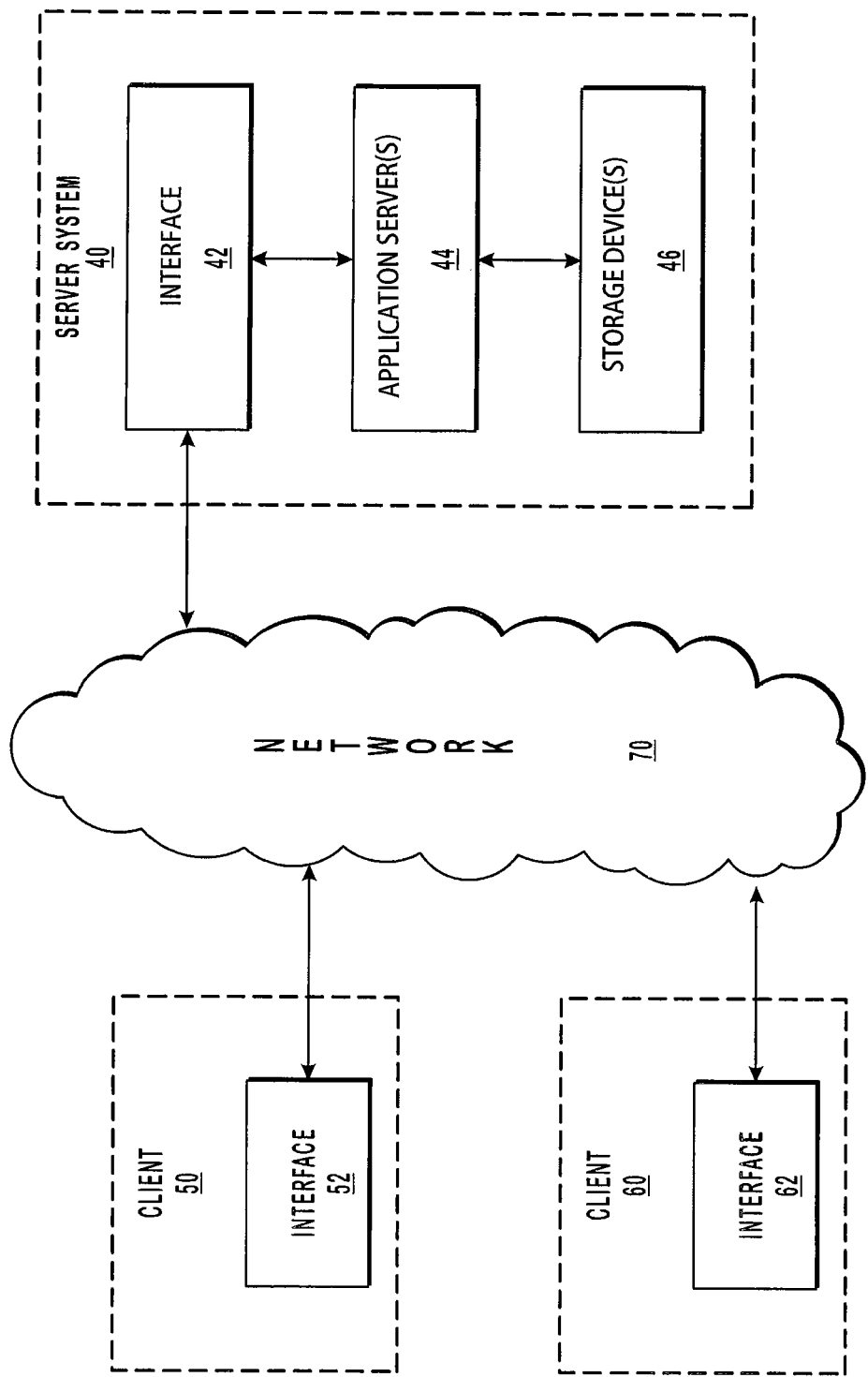
FIG. 3 illustrates a representative networking system that provides a suitable operating environment for use of the present invention.

While those skilled in the art will appreciate that the invention may be practiced in networked computing environments with many types of computer system configurations, FIG. 3 represents an embodiment of the present invention in a networked environment that includes clients connected to a server via a network. While FIG. 3 illustrates an embodiment that includes two clients connected to the network, alternative embodiments include one client connected to a network or many clients connected to a network. Moreover, embodiments in accordance with the present invention also include a multitude of clients throughout the world connected to a network, where the network is a wide area network, such as the Internet.

Exemplary Embodiments of Technical Tools

In some embodiments, technical tools operating with computer systems facilitate or provide efficient means to implement the structures and systems of the present invention related to educational systems and institutions. Though many technical tools are comprised in the present invention, only a limited number of such tools are described herein. In some embodiments, technical tools may comprise non-electric manufactured articles.

The use of technical means generally facilitates use of the present invention by removed barriers imposed by the prior art. As non-limiting examples, the requirement in the prior art that many facets of an educational institution be organized around administrative efficiency rather than educational effectiveness may be seen as a requirement imposed by cost concerns in the prior art. By using technical tools as disclosed herein, however, systems and methods can permit ease of administration within a system designed with the primary goal of educational effectiveness.

Figure 4:
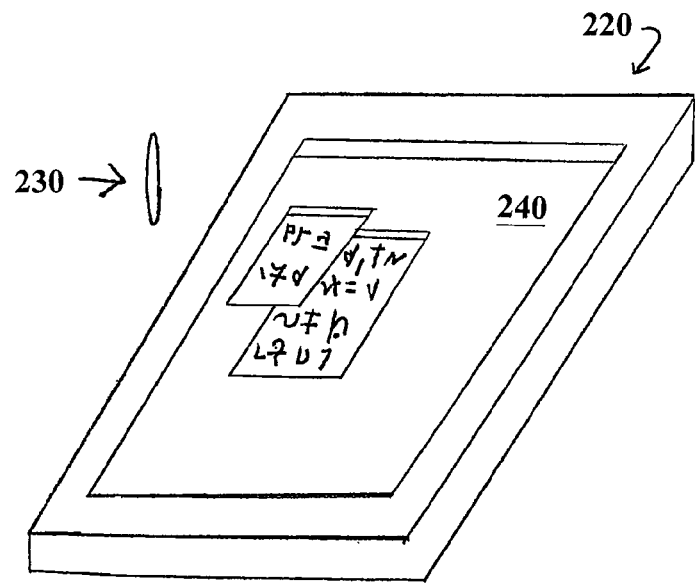
FIG. 4 illustrates one embodiment of a computer system in which technical tools according to some embodiments may be implemented.

In some embodiments, the computer system herein disclosed is disposed in a slate format 220 as shown in FIG. 4. The slate format 220 can comprise a tablet-style computer having a stylus 230 and a display device 240 on which a user may both view materials and direct input to the computer system. Such a slate format 220 can be considered to resemble in some aspects the personal chalk-board slate of generations past, on which a student would perform multiple tasks individually or in cooperation with other students or instructors. By using this slate format 220 within a computer system that comprises network connectivity, a slate can provide the benefits of, without limitation, a personal workspace, connectivity to a virtually unlimited array of educational support material, interaction with other individuals located locally or remotely, opportunity to interact as both an instructor or tutor to other students and as the recipient of instruction, and the ability to track all activity of the student to measure progress and direct future activities into the most productive paths.

In like manner, a record may be made of the activities of instructors, including, without limitation, the nature and number of assignments made to students, grades or other evaluations assigned or given to students or recorded privately to a student's file, specific concepts that the student has evidenced mastery of in one or more academic disciplines 100, video clips of instructional periods, and otherwise.

In one embodiment, all records maintained by the system relative to both students and teachers are integrated in a manner permitting (but not requiring) direction of future instructional activities based on information contained in records of past activities, evaluations, and so forth. For example, records may indicate that a student has previously read a particular book as part of a learning module related to a set of reading goals, such as certain phonic elements. By using the records to recognize this previous work, an instructor may guide or develop specific future lesson plans for classroom use, or may determine that the same book may be effectively used again by the same student to illustrate a grammar concept, a story format, or some other concept, wherein the student's known familiarity with the book based on previous instruction can facilitate the student's understanding of new, more complex concepts that are to be found within the same text.

As a further example, an instructor may use records maintained by the system to view aggregated lists of materials used by one student, materials used by a number of students, average evaluation ratings of students who have used a particular learning tool, the average evaluation ratings in one or more aspects of students who have been instructed by a particular instructor, and many other possibilities. Each instructor's activities may be tracked by the date and time at which particular activities were performed, in order to better understand the effectiveness of the learning tools used by that instructor with a particular student, group of students, or generally.

Autophonics Structures

In some embodiments of the present invention, instruction in language arts or reading skills comprises an English-language autophonics structure, as defined herein. Similar definitions can be understood for similar structures in other languages, all of which are comprised within the invention.

An autophonics structure comprises a multi-dimensional representation the sounds comprising a collection of words. In one embodiment, substantially all of the single-syllable words in English are represented in a cube shape. The cube is visually divided into cells. Each cell along a first edge of the cube represents the possible initial sounds of words; each cell along a second edge of the cube represents the possible final sounds of words; each cell along a third edge of the cube represents the possible middle or vowels sounds of words. According to this structure, a one-syllable word is represented by a point within the three-dimensional structure defined by the intersection of the planes in which the three cells corresponding to the three sounds in that word lie. In some embodiments, each cell represents a phonetic element, or corresponds to a phoneme of English; in other embodiments, each cell represents one or more letters, or corresponds to the spelling of a word in English. In one embodiment, the cells corresponding to consonants comprise representations of single consonants, consonant blends, and consonant digraphs, while the cells corresponding to vowels comprise representations of short vowels, long vowels, vowel digraphs, and modified vowels.

Extensive multi-dimensional structures are possible to represent the sequences of sounds occurring in English words. The same or similar structures may be used to represent words in any human language in a similar manner.

Figure 5:
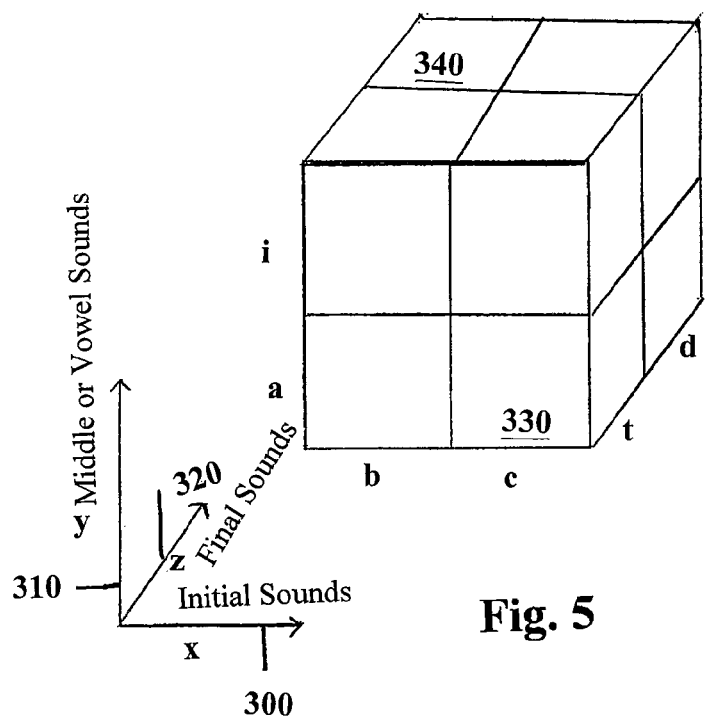
FIG. 5 illustrates a simplified autophonics structure.

For illustrative purposes, consider the cube shown in FIG. 5. The horizontal or X axis 300 is divided into cells each representing the first letter of a word; the vertical or Y axis 310 is divided into cells each representing the vowels in the middle of a word; the third-dimensional or Z axis 330, extending into the page, is divided into cells each representing the last letter of a word. Using this structure, the word C-A-T is represented by the cell 330 located at "C" on the X axis 300, "A" on the Y axis 310, and "T" on the Z axis 320. The word B-I-D is represented by the cell 340 located at "B" on the X axis 300, "I" on the Y axis 310, and "D" on the Z axis 320.

By collecting information about the words that a student can identify (such as those a student can speak, or read, or spell), an instructor can visually and immediately identify areas where the student lacks a clear understanding needed to progress. In the simplified illustration of FIG. 5, only two cells are provided in each axis, thus limiting severely the number of words that can be represented in the cube. As it may be fully implemented, however, the cube might contain 10-50 or more cells per side or axis, depending on the items chosen to be represented, as noted previously. By reviewing the cells occupied and unoccupied by a mapping of student progress, an instructor could, for example, immediately and easily see that the student, while perhaps an adequate beginning reader, did not have an adequate understanding of consonant blends that begin with the letter F, or of two particular vowel diphthongs, because a large number of words mapping to that portion of the cube were not used or noted—the cube mapped with the student's progress might thus clearly show a blank row or column corresponding to the area of poor understanding. By the information provided via the cube, the instructor can easily determine the most efficient way to remedy an area of weak understanding and "fill in" areas of the cube, thus markedly improving the student's understanding without a hit-and-miss approach that fails to recognize the core lack in the student's understanding.

In this cube structure, some cells would be irrelevant as referencing non-existent sequences of sounds or letters. But this does not diminish its overall usefulness.

A structure such as disclosed in this embodiment is of limited usefulness when implemented or illustrated on paper, but within a computer system, this structure can be populated with data, manipulated, analyzed, and viewed very efficiently. An instructor having software programs based upon this embodiment can, for example, provide a body of testing data from one or more students to be mapped to one or more autophonics structures. The instructor can then have a computer analyze areas of weakness on a per-student or overall basis. The instructor can also view in a graphical display, including zoom and fly-through modes, those portions of the cube that are of greatest interest.

In some embodiments, an autophonics structure is provided with data via an automatic link between a computer program that provides and controls the autophonics structure and another computer program that gathers data from one or more students related to their use or knowledge of the materials mapped within that structure. An example of this automatic linking is provided hereinafter.

In some embodiments, the computer system that provides access to an autophonics structure also provides links from words within that structure—that is, to words represented by cells or elements within the structure—to additional words that are derivatives of the words within the structure. As non-limiting examples, a one-syllable word accessed by a student within an autophonics structure might provide links or access to other tenses, numbers, compounds, and similar variations, similar to a comprehensive dictionary listing, in which a student can see how the word is formed or used in multiple contents. For example, the word "book" might include links to books, booked, booking, bookshelf, bookkeeper, and others. In other embodiments, links to antonyms or synonyms can also be provided.

User-Controlled e-Books

Yet another embodiment of a technical tool comprised within the present invention is an electronic book or e-book. In some embodiments this e-book comprises a user-controlled e-book. A user-controlled e-book comprises a standard e-book, or text of a book in electronic format, accessible via a computer system on a visually perceptible output device such as, without limitation, a slate format computer system 220. A user-controlled e-book further comprises an input method by which a student may interact with the e-book, such as, without limitation, a stylus 230, by which the student can control the actions of the computer system that is displaying the e-book.

Input methods can include any suitable method for input to a computer system as is known in the art, including, without limitation, movement of an on-screen pointer via a mechanical mouse, optical mouse, or track-ball; touch screen; stylus pad; or otherwise.

Such e-books can have a vocalization feature in which the text of an e-book stored in a computer system is read aloud, either by an audio recording of a human voice or by a computer-generated rendition of the text based on voice synthesis technologies as are known in the art.

When operated according to this embodiment, a student uses the input method to indicate a word within the text of the e-book, which is displayed on the screen or another output device. The computer system then vocalizes the word indicated by the student. This pattern is repeated, with the student determining the rate of vocalizations—that is, the speed of the reading aloud feature—based on how rapidly the state of the input method is altered by the student. In one embodiment, the student can move a finger or stylus slowly along the visual text of an e-book, controlling the speed of the vocalization to match that of the student's own readying ability. In one embodiment, the e-book may continue to read at the most recent speed or at a default speed if input from the student ceases, such as if the student lifts the finger or stylus from the screen on which the e-book is visible. In one embodiment, the vocalization of the e-book does not continue if input from the student ceases.

In one embodiment, the student is assumed to have a higher level of reading ability, so that vocalizations only occur when the student uses an input device to indicate a word in the e-book, including an indication in a particular manner, such as a double-tap of a stylus or finger.

Yet additional features of an e-book according to some embodiments of the present invention can facilitate further advantages of the educational structures disclosed herein.

In one embodiment, the e-book retains information about all student input and can store that information for later review by an instructor, parent, or student, or can optionally communicate that information to another computer, where it can, without limitation, be studied to review individual actions within an e-book, aggregated into a statistical picture of an individual student's preferences and progress across many e-books, or aggregated into a statistical picture of preferences and progress across many students accessing either that single e-book or many e-books.

In one embodiment, the e-book is a single element within an e-library, where the individual texts of e-books within the e-library have been analyzed to record within the electronic records comprising the e-library certain characteristics of each e-book. Such characteristics can include, without limitation, a catalog of all words within that e-book, including the frequency of each word, as well as statistical information about the sounds within the words. By providing data about such characteristics, the computer system controlling access to the e-book can direct students to additional materials, including additional e-books, that address specific weaknesses in the student's performance, in order to strengthen that performance, that build on areas of greatest strength, to further promote progress in areas of giftedness, to provide access to areas of particular interest to the student (such books about animals, books about pirates, picture books, chapter books, etc.), or otherwise.

Both e-books and additional technical tools as disclosed herein may be offered for sale and delivered to potential users via interactive networked means, including via e-commerce or Web sites. In some embodiments, e-books may be delivered to potential users as downloaded files comprising standard formats such as Portable Document Format or XML format data, or non-standard specialized formats created specifically for the e-book. In some embodiments, e-books may be delivered to potential users via a non-downloadable interactive embodiment, including such an embodiment comprising a web browser connected to a network-accessible server capable of streaming portions of an interactive e-book to the web browser. In some embodiments, such interactive e-books delivered via a network-accessible server may comprise delivery via a web-service-style interface, as is known in the art.

In some embodiments, e-books may be printed in paper format via an "on demand" feature when requested by a user, including a student or instructor.

Access to additional materials from within an e-book or from within a software system that provides access to one or more e-books can be entirely directed by a student or instructor, based on the student's preferences or goals, such as selecting e-books from a library of available titles; or may be suggested by the computer system based on analyze of the student's preferences or progress in educational areas, which may be determined based on default settings or on settings configured by a level instructor, a subject matter instructor, a parent, or others.

Use of an e-book according to some embodiments may comprise automatic linking of data gathered during use of the e-book to an autophonic analysis tool as disclosed herein, or to catalogs of statistical data related to the e-books available to the student or to the instructor.

Use of an e-book according to some embodiments may comprise automatic linking of data gathered during use of the e-book to data gathered from the actions of one or more instructors, so as to permit analysis of the needs or successes of a particular student, a group of students, a particular instructor, or a group of instructors, according to any parameter selected by the one viewing such data as provided by systems within the present invention.

One non-limiting example of a catalog of statistical data that may be associated with an e-book is a high-frequency word list that contains a listing of words within one or more e-books, where such listings may be subdivided into listings by individual e-book or chapter or aggregated into larger categories. Such high-frequency word lists can include fields of data corresponding to characteristics of each word, so as to permit noting or flagging certain words based on these characteristics. Such characteristics may include, without limitation, the type of vowel sounds used within the word, whether consonant blends are used within the word, whether the word is a compound word, whether the word includes silent letters, whether the word is irregular in its pronunciation or in its spelling, or otherwise. By integrating access to such a high-frequency word list with statistical data relating to a student's use of an e-book as disclosed herein and optionally to an analysis within an autophonics structure, a student, instructor, or parent may more effectively determine which e-book texts can provide the most effective learning tool to build weak areas of a student's understanding, review strong areas of understanding, or otherwise as may be desired.

Additional types of correlated data can be integrated with an e-library environment according to some embodiments. As non-limiting examples, individual words, phrases, chapters, or e-books can be linked, whether automatically, by default, as indicated by an instructor or selected by a student during use, with resources related to the content of the e-book. For example, a children's picture book related to a pirate adventure could include links to the history of the Caribbean, to other books describing the culture of areas depicted in the book, to sailing or to oceanography, to plays related to pirates, to coin collecting, to recordings of pirate songs or music from regions where pirates lived, to biographies of specific pirates, to artwork related to pirates, to the web site of the artist who illustrated the book, or to many other resources.

In addition, links within the computer environment of an e-book can provide access to e-commerce areas where a student may purchase educational or other materials related to the subject of the e-book or otherwise, either using a credit card, a system of classroom points, or otherwise.

The nature of additional resources presented as links within an e-book can be linked to characteristics of the student who is viewing those links, including, without limitation, the student's overall reading ability, the student's age, the student's history of reviewing links categorized as being of a specific type, restrictions or preferences determined by an instructor or parent, or otherwise. For example, a seven-year-old student reading Treasure Island could be presented with a different collection of links compared to those presented to a fourteen-year-old student reading the same e-book.

Spiral Curriculum

According to some embodiments of the present invention, the content of curriculum provided to students in an educational institution comprises a spiral curriculum. A spiral curriculum comprises a multi-path curriculum that can profitably be traversed multiple times by a single student operating at different levels. Such a curriculum as applied to a particular academic discipline can include all knowledge related to that discipline through a certain level (such as university level). A student can begin within the spiral curriculum by studying a particular area or topic, but may then return to that topic at a later time, such as the following month or the following year, exploring the topic in greater depth based on additional understanding or insights gained in that or other disciplines during the intervening time. A spiral curriculum is not focused on the grade level of information, but on a structure in which information may have a foundation on which additional pieces are built. Relationships and linkages are formed between information within the full curriculum, and between the spiral curriculum designed for one discipline and that of another discipline. These relationships form pathways to facilitate exploration of knowledge within the full curriculum without traditional limits based on grade level or on reviewing a given set of topics or material a single time during the school years. These relationships also create and facilitate a curriculum that can be entered at any point and explored in a student-directed manner.

Technical tools, including without limitation those specific technical tools disclosed herein, facilitate access to a spiral curriculum by, among other things, providing convenient and non-linear access to the large amount of material, resources, and knowledge comprised within such a curriculum.

The spiral curriculum for a specific academic discipline may comprise key areas into which the curriculum is divided. As one non-limiting example, the spiral curriculum for language arts may be divided into categories such as comprehension, literary elements, and language, each of which may be further divided into multiple elements of finer and finer grain depending on the student's familiarity with the material. The spiral curriculum may draw upon or revisit resources in multiple ways or at multiple times based on the position of the student within the overall curriculum.

As one non-limiting example, a student can begin to learn about language by learning the phonetic elements of the English language; later by learning the parts of speech such as noun and verb; later by learning the structure of sentences; and still later by learning more about the structure of possible sounds and the historical reasons behind those structures. The progression of a student through these levels of understanding of the English language (i.e., its grammar and linguistic structure) is not dependent on the age of the learner, but only on the student's preferred rate of progress through more and more advanced levels of understanding. A student may return or "circle back" to a portion of the language learning section within the analogous spiral structure of the curriculum after exploring other areas of language arts, after learning additional material in another academic discipline, or after reaching a greater level of maturity through life experiences or an increase in age. When the student is prepared to appreciate and understand a more complex understanding of concepts within a particular area of the curriculum, that area may be revisited. Further, the materials used within the spiral curriculum may be used repeatedly at different levels within the curriculum. For example, the book Huckleberry Finn may be used initially as a story read aloud to younger students to illustrate the power of a good story; later as a book to be read by the students themselves, including to study the use of language by a great author; later as a study of various aspects of American literature; and at another time as a text for a study of various aspects of the Civil War or of the black experience in the American South.

As another non-limiting example, the spiral curriculum related to music could include one aspect focused on the theory of technical elements of music such as rhythm, pitch, harmony, and dynamics; another aspect could be focused on the development of musical styles, from renaissance, to Baroque, to classical, etc.; another aspect could be focused on skills in playing the violin or in vocal performance. A specific piece of music could be used as part of the curriculum at multiple points, referencing the technical aspects of the piece at one point; the stylistic background of the piece and its composer at another point; and the exemplary performance of a violinist at still another points.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:
1. A method of teaching reading comprising:
providing a list of words;
using a computer processor to provide an autophonic structure that is divided into multiple cells, wherein the autophonic structure comprises:

a first edge that is associated with a plurality of initial sounds occurring in the list of words, wherein each of the initial sounds corresponds to a plurality of cells of the autophonic structure;

a second edge that is associated with a plurality of final sounds occurring in the list of words, wherein each of the final sounds corresponds to a plurality of cells of the autophonic structure, and wherein the second edge is disposed substantially perpendicular to the first edge; and a third edge that is associated with a plurality of middle or vowel sounds occurring in the list of words, wherein each of the middle or vowel sounds corresponds to a plurality of cells of the autophonic structure, and wherein the third edge is disposed substantially perpendicular to both the first edge and the second edge so that at least one word in the list of words corresponds to a cell in three dimensions of the autophonic structure representing component sounds of the at least one word in the list; and matching an identified word that has been identified by a user with a specific cell of the autophonic structure corresponding to constituent sounds of the identified word.

2. The method of claim 1, further comprising repeating the matching step for multiple words that have been identified by the user.

3. The method of claim 2, further comprising identifying cells within the autophonic structure that do not correspond to the multiple words that have been identified by the user.

4. The method of claim 1, further comprising mapping the user's progress by identifying one or more cells in the autophonic structure that correspond to one or more words the user identifies, and identifying one or more cells in the autophonic structure that correspond to one or more words the user did not identify.

5. The method of claim 1, further comprising mapping the progress of multiple users by identifying one or more cells in the autophonic structure that correspond to one or more words the users identify, and indentifying one or more cells in the autophonic structure that correspond to one or more words the users did not identify.

6. The method of claim 1, further comprising linking the identified word with at least one related word.

7. A non-transitory computer readable storage medium for providing computer program code means utilized to implement a method for teaching reading wherein the computer program code means is comprised of executable code for implementing steps for:

providing an autophonic structure, having:

a first edge associated with multiple initial word sounds, wherein each of the initial word sounds corresponds to a plurality of cells in a first plane of the autophonic structure a second edge associated with multiple final word sounds, wherein each of the final word sounds corresponds to a plurality of cells in a second plane of the autophonic structure; and a third edge associated with possible multiple middle or vowel word sounds, wherein each of the middle or vowel words sounds corresponds to a plurality of cells in a third plane of the autophonic structure, wherein the third edge runs substantially perpendicular to the first edge and the second edge, and wherein a particular word from a plurality of words is represented by a cell of the autophonic structure that is defined by an intersection of first, second and third planes in which three cells, corresponding to the three word sounds in the word, lie; and using the autophonic structure to collect information about specific words a first user identifies.

8. A non-transitory computer-readable storage medium of claim 7, wherein the computer program code means is further comprised of executable code for implementing a step of identifying at least one cell in the autophonic structure, which corresponds to at least one word the first user identifies, as being "occupied".

9. A non-transitory computer-readable storage medium of claim 7, wherein the computer program code means is further comprised of executable code for implementing a step of linking at least one of the specific words the first user identifies with at least one additional related word.

10. A non-transitory computer-readable storage medium of claim 7, wherein the specific words the first user identifies comprise one-syllable words.

11. A non-transitory computer-readable storage medium of claim 8, wherein the computer program code means is further comprised of executable code for implementing a step for presenting the identified cells to a second user.

12. A non-transitory computer-readable storage medium of claim 7, wherein the computer program code means is further comprised of executable code for implementing a step for mapping the first user's progress by identifying one or more cells in the autophonic structure that correspond to one or more words the first user identifies, and identifying one or more cells in the autophonic structure that correspond to one or more words the first user did not identify.

13. A non-transitory computer-readable storage medium of claim 7, wherein the first user identifies the specific words through a technique selected from reading, speaking, and spelling the specific words.

14. A non-transitory computer-readable storage medium of claim 8, wherein a row or column of unoccupied cells in the autophonic structure corresponds to an area of poor understanding for the first user.

15. A non-transitory computer-readable storage medium of claim 7, wherein the autophonic structure comprises 2 cells disposed along the first edge, 2 cells disposed along the second edge, and 2 cells disposed along the third edge.

16. A tool for teaching reading, comprising:

an autophonic structure, comprising:

a first edge associated with multiple initial word sounds, wherein each of the initial word sounds corresponds to a plurality of cells in a first plane of the autophonic structure;

a second edge associated with multiple final word sounds, wherein each of the final word sounds corresponds to a plurality of cells in a second plane of the autophonic structure; and a third edge associated with multiple middle or vowel word sounds, wherein each of the middle or vowel word sounds corresponds to a plurality of cells in a third plane of the autophonic structure, wherein the third edge runs substantially perpendicular to the first edge and the second edge, and wherein a particular word is represented by a cell of the autophonic structure that is defined by an intersection of the first, second, and third planes in which three cells, corresponding to three sounds in the word, lie.

17. The tool for teaching reading of claim 16, wherein the autophonic structure comprises 2 cells disposed along the first edge, 2 cells disposed along the second edge, and 2 cells disposed along the third edge.

* * * * *